United States Patent
Jarratt

(10) Patent No.: US 6,760,198 B2
(45) Date of Patent: Jul. 6, 2004

(54) MAGNETIC MULTILAYERED FILMS WITH REDUCED MAGNETOSTRICTION

(75) Inventor: James Devereaux Jarratt, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 09/894,193

(22) Filed: Jun. 27, 2001

(65) Prior Publication Data

US 2003/0002227 A1 Jan. 2, 2003

(51) Int. Cl.[7] ............................................. G11B 5/127
(52) U.S. Cl. ....................................................... 360/319
(58) Field of Search ........................... 360/319, 324.11, 360/324, 324.12, 324.13, 326, 313, 324.2; 428/332

(56) References Cited

U.S. PATENT DOCUMENTS

| | | | |
|---|---|---|---|
| 4,242,710 A | 12/1980 | Hempstead et al. | |
| 4,814,921 A | * 3/1989 | Hamakawa et al. | ........ 360/126 |
| 4,897,318 A | 1/1990 | Sakakima et al. | .......... 428/635 |
| 5,234,775 A | 8/1993 | Dirne et al. | ................. 428/635 |
| 5,549,978 A | 8/1996 | Iwasaki et al. | .............. 428/692 |
| 5,751,528 A | 5/1998 | Nepela et al. | ............... 360/126 |
| 5,850,325 A | 12/1998 | Miyauchi et al. | ........... 360/113 |
| 5,879,798 A | * 3/1999 | Kobayashi et al. | ......... 428/332 |
| 5,920,979 A | 7/1999 | Nepela et al. | ........... 29/603.13 |
| 6,381,094 B1 | * 4/2002 | Gill | ............................. 360/126 |
| 6,424,507 B1 | * 7/2002 | Lederman et al. | ..... 360/324.11 |
| 6,563,677 B2 | * 5/2003 | Narumi et al. | .............. 360/319 |
| 6,661,606 B2 | * 12/2003 | Sano et al. | ................. 360/126 |

FOREIGN PATENT DOCUMENTS

JP   2001 015339 A   1/2001

* cited by examiner

Primary Examiner—Allen Cao
(74) Attorney, Agent, or Firm—Silicon Valley IP Group, PC; Dominic M. Kotab

(57) ABSTRACT

It is the primary object of the present invention to provide a shield and pole material with reduced magnetostriction while preserving good magnetic characteristics. This material is used in recording heads in tape and disk drives. The material is a repeating sequence of three layers. One layer is FeX(N) where the (N) indicates a nitrogenated film and the additional element, X, is preferentially Ta but can be selected from a group of elements. Another layer is made from a NiFe alloy. The third layer, disposed between the FeX(N) and NiFe layers is tantalum. The sequence of three layers is repeated to build the required thickness for the final material.

18 Claims, 13 Drawing Sheets

(film #1)

(film #2)

(film #3)

(film #4)

| Film | annealed? | Moment (Mo, kG) | Magnetostriction | Film stress (MPa) |
|---|---|---|---|---|
| #1 | No | 12.4 | -5.4E-006 | -154 |
| #1 | Yes | - | 2.0E-006 | 196 |
| #2 | No | 13.0 | 1.5E-006 | -152 |
| #2 | Yes | - | 3.4E-006 | 73 |
| #3 | No | 12.9 | 4.5E-006 | -160 |
| #3 | Yes | - | 1.6E-006 | 235 |
| #4 | No | 13.6 | 6.3E-006 | -130 |
| #4 | Yes | - | 7.6E-006 | 90 |

FIG. 10

MAGNETIC MULTILAYERED FILMS WITH REDUCED MAGNETOSTRICTION

BACKGROUND OF THE INVENTION

1. Field of the Invention

This invention relates to the magnetic materials used in recording heads for disk and tape drives and more specifically to the reduction of magnetostriction in these materials.

2. Description of the Background Art

Recording heads are widely used in disk drives and tape drives for storage and retrieval of digital information. Recording heads usually have separate write and read elements. Soft magnetic material having a low coercivity and a high saturated magnetic moment is used for the poles of the write element and the shields for the read element. In a tape drive the tape is in frequent contact with the recording head. Therefore, wear resistance is an important additional consideration in a tape drive.

The shield layers and write head poles are in close proximity to the read sensor. Because of this proximity, it is important that the layers be magnetically stable. It is important for the performance of the drive that the soft magnetic material be relatively free of stress and magnetostriction because these effects can lead to magnetic instability. If the magnetic domains in the shields and poles move when subjected to extraneous fields such as fields from the write head or fields from the rotating magnetic disk (or more precisely, when the walls between different magnetic domains move, resulting in the growing or shrinking of domains), Barkhausen noise is generated and is sensed in the read element. This noise can seriously degrade the quality of the readback signal. Furthermore, when after movement the domains do not come back to their original position, the shield or pole exerts a field which is oriented differently on the sensor layer in the read element. This changes the magnetic bias on the read element leading to signal asymmetry and increased error rates. Finally, the magnetic permeability of the shields or pole layers can be reduced with this non-repeatable or hysteretic behavior of the domains and this also has a detrimental effect on the read element performance.

A common set of materials used in shields and poles are alloys of nickel and iron. For example Ni(80%)Fe(20%) has good magnetostriction but somewhat limited saturated moment (Ms≅10 kG). Increasing the Fe content increases the moment but leads to high magnetostriction. For example Ni(45%)Fe(55%) has better moment (Ms≅16 kG) but a rather high magnetostriction of about $25 \times 10^{-6}$. Attempts have been made in the past to laminate materials using alternate layers of materials having positive and negative magnetostriction. These films tend to have high local stress at the interfaces between layers. Another approach to develop a material with improved magnetic stability has lead to the development of alternate layers of magnetic and non-magnetic layers. The addition of a significant amount of non-magnetic material results in a significantly reduced moment for the overall laminate.

A material is needed to construct recording heads which exhibits very low magnetostriction while not sacrificing the good magnetic properties of low coercivity and high magnetic moment.

SUMMARY OF THE INVENTION

In one embodiment of the present invention a material is provided to use in forming recording heads which has reduced magnetostriction and good magnetic properties. In another embodiment of the present invention disk drives and tape drives are provided having recording heads formed from a material having reduced magnetostriction and good magnetic properties. The reduced magnetostriction in a material according to one embodiment of the present invention provides a significant improvement in the performance of the recording heads.

In a prefered embodiment the material according to the present invention is a repeating sequence of three layers. One layer is made from an alloy of NiFe. Another layer comprises FeX(N) where the (N) indicates a nitrogenated film and the additional element, X, is preferentially Ta but can be selected from a group of other elements. The third layer, disposed between the FeX(N) and NiFe layers is tantalum. The sequence of three layers is repeated to obtain the required thickness for the final material.

The material has an intrinsically smaller value of magnetostriction and the magnetostriction is usually decreased with annealing resulting in simplified processing. The material also has improved magnetic moment compared with permalloy. Other aspects and advantages of the present invention will become apparent from the following detailed description, which when taken along with the drawings, illustrate by way of invention the principles of the invention.

BRIEF DESCRIPTION OF THE DRAWINGS

FIG. 1b shows a cross section side view of a disk drive as taken from line 1b—1b in FIG. 1a;

FIG. 10 shows a table of results from the multilayered films shown in FIGS. 9a, b, c, and d;

DETAILED DESCRIPTION OF THE INVENTION

Figure 1A:
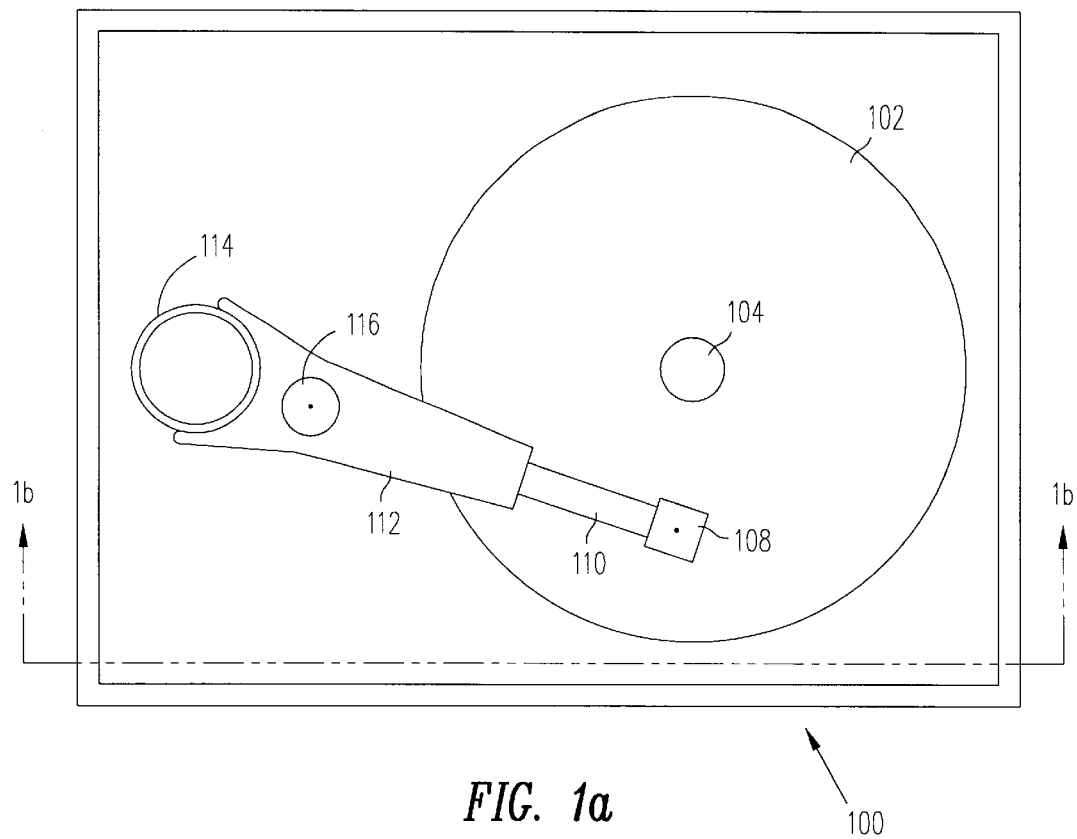
FIG. 1a shows a top view of a disk drive.
Figure 1B:
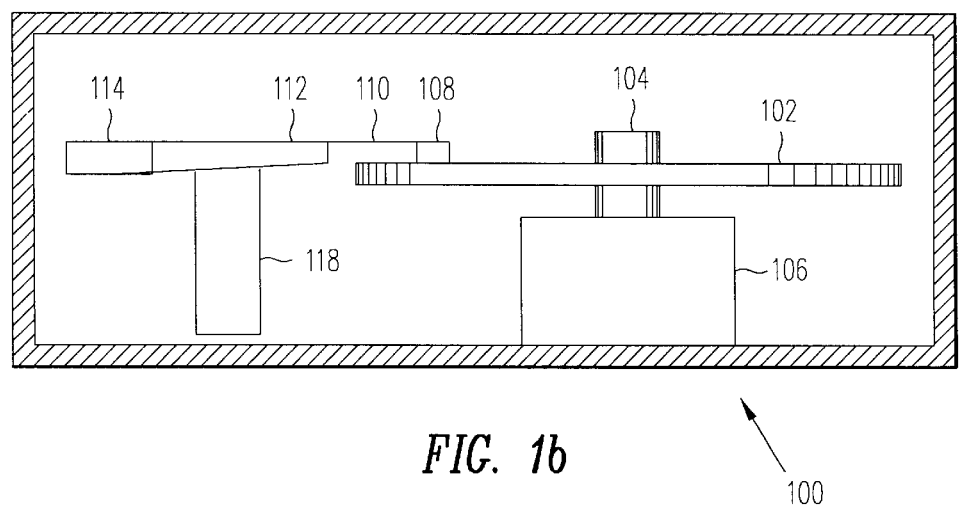

With reference to FIGS. 1a and 1b, the present invention can be incorporated into a disk drive generally referred to as 100. The disk drive 100 includes at least one recording disk 102. The disk 102 is mounted on a spindle 104 which is connected to a motor 106. During the operation of the disk drive 100, the motor 106 spins the spindle 106 thereby rotating the disk 102. A slider 108 which has an attached recording head is connected to a suspension 110. The suspension 110 is attached to an arm 112. The arm 112 has a coil 114 mounted on a distal end from the suspension 110. During normal operation the actuator assembly which includes the slider 108, the suspension 110, the arm 112, and the coil 114 rotates about a pivot point 116 defined by the location of an actuator post 118.

Figure 2:
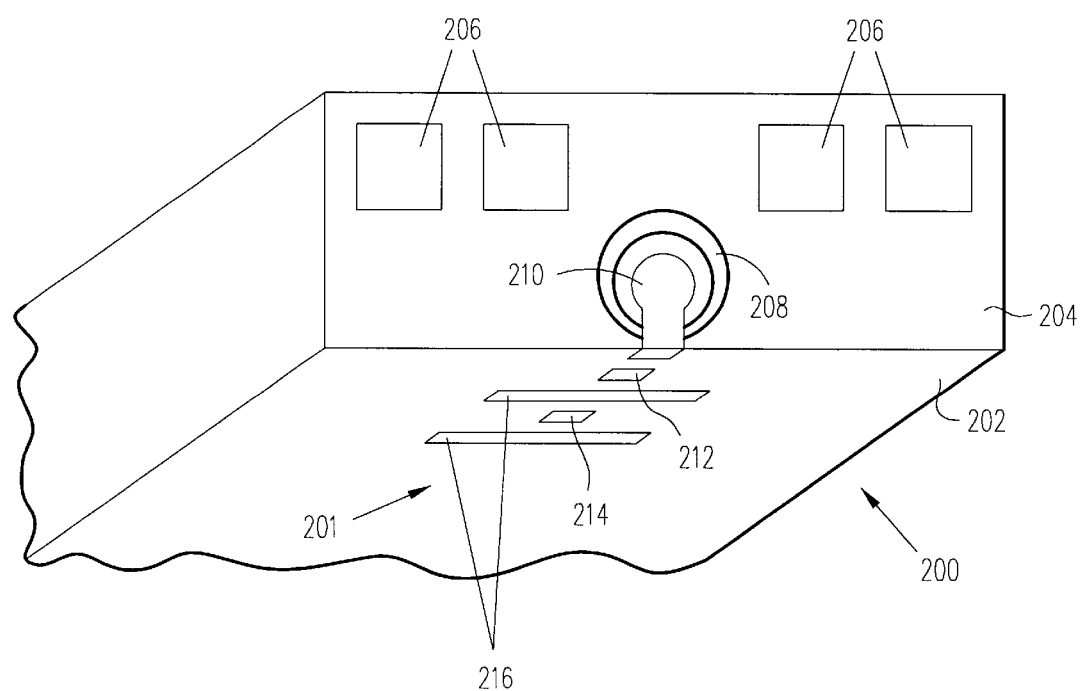
FIG. 2 shows a detailed perspective view of a recording head attached to a slider.

A detailed view of the recording head mounted on the slider is shown in FIG. 2. The slider 200 has a surface 202 which is in close proximity to the recording disk. This surface 202 is commonly called the air bearing surface (ABS). The slider 200 also has a trailing surface 204 upon which a recording head 201 is constructed which will be described in detail below. The recording head 201 includes a read element 214 and a write element 500 which will be described in more detail with reference to FIG. 5. The view of the trailing surface 204 of the slider 200 shows metallic pads 206 for making connections to the recording head 201, coils 208 for energizing the write element, and an upper pole 210 of the write element 500. The view of the air bearing surface 202 usually shows a portion of the upper pole 210 of the write element 500, a portion of the lower pole 212 of the write element 500, a read sensor 214, and two shields 216 disposed around the read sensor 214. The write element 500 is comprised of the upper pole 210, the lower pole 212, and the coils 208.

Figure 3:
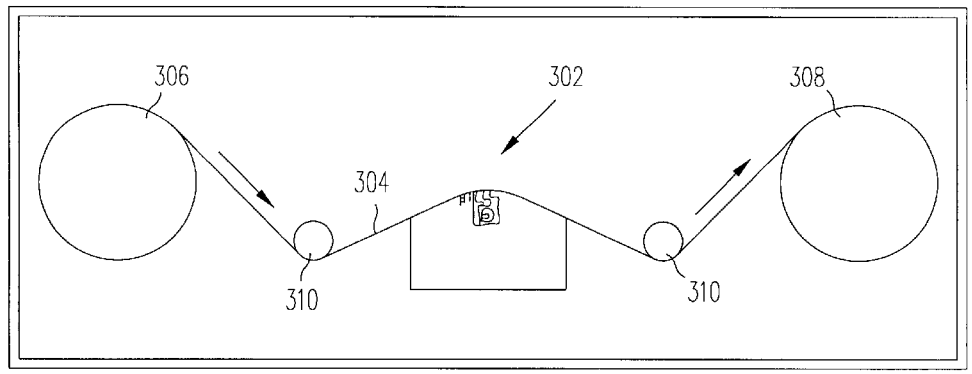
FIG. 3 shows a tape drive used primarily for storage and retrieval of digital information.

Tape drives can be used for storage and retrieval of digital information and for recording and playback of audio or video information. The recording heads using for digital applications generally have limited mobility. For example in FIG. 3 a typical tape drive 300 for digital information is shown. The tape drive 300 has at least one non-rotating recording head 302. Typically there are several recording heads in a row and the head assembly has the capability of some limited lateral movement to compensate for shifts in tape position. In addition to a recording head 302 the tape drive 300 has a tape transport for advancing a tape 304 from a first reel 306 to a second reel 308. The reels 306, 308 (sometimes called spools) can be individual devices or they can be contained in a cassette housing. Typically the tape transport includes one or more rollers 310 to help position and move the tape 304 across the recording head 302.

Figure 4:
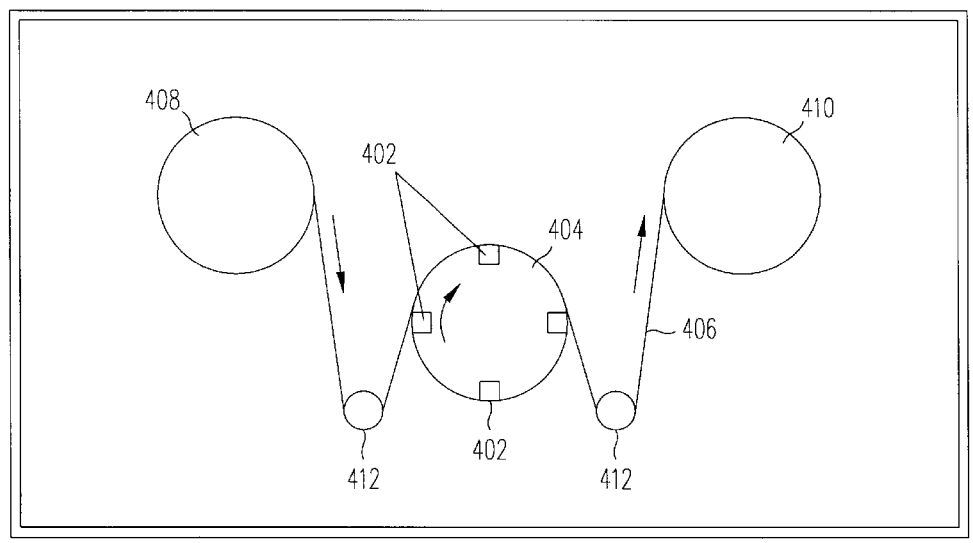
FIG. 4 shows a tape drive used primarily for storage and retrieval of audio and video information.

Another style of tape drive 400, shown in FIG. 4, is commonly used for recording audio and video information. The tape drive in FIG. 4 typically has two or more recording heads 402 mounted in a rotating drum 404. The tape 406 is moved past the rotating drum 404. There are typically two reels 408, 410 which can be independent or contained in a cassette housing. Typically the tape transport includes one or more rollers 412 which help position and move the tape 406 across the recording heads 402 on the rotating drum 404.

Figure 5:
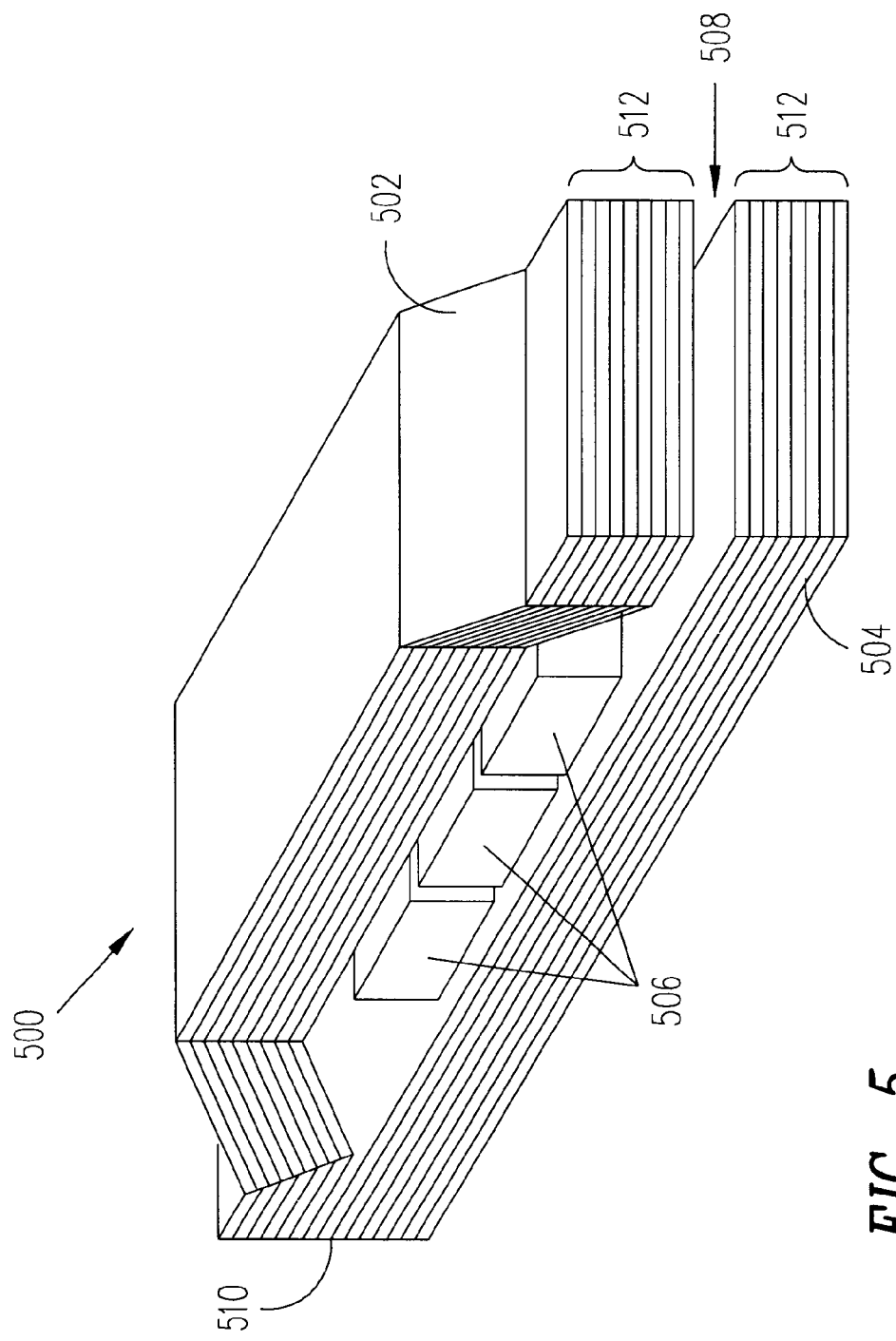
FIG. 5 shows a diagram of a write element.

With reference to FIG. 5, the basic features of the write element 500 of the recording heads for both disk drives and tape drives are described. The write element 500 is comprised of an upper pole element 502, a lower pole element 504, and a number of coils 506 disposed between the upper 502 and lower 504 poles. There is a gap 508 between the two poles 502, 504 near the recording medium commonly called the write gap. The poles 502, 504 are in magnetic contact at the distal end 510 of the poles from the write gap 508. FIG. 5 shows the upper pole 502 and the lower pole 504 as having a series of thin laminations 512 in accordance with the present invention. While the write element 500 is described with reference to the slider 200 in FIG. 2 it will be appreciated by those skilled into the art that a similar write element could be used with the tape head 302 in FIG. 3 or the tape head 402 in FIG. 4.

Figure 6:
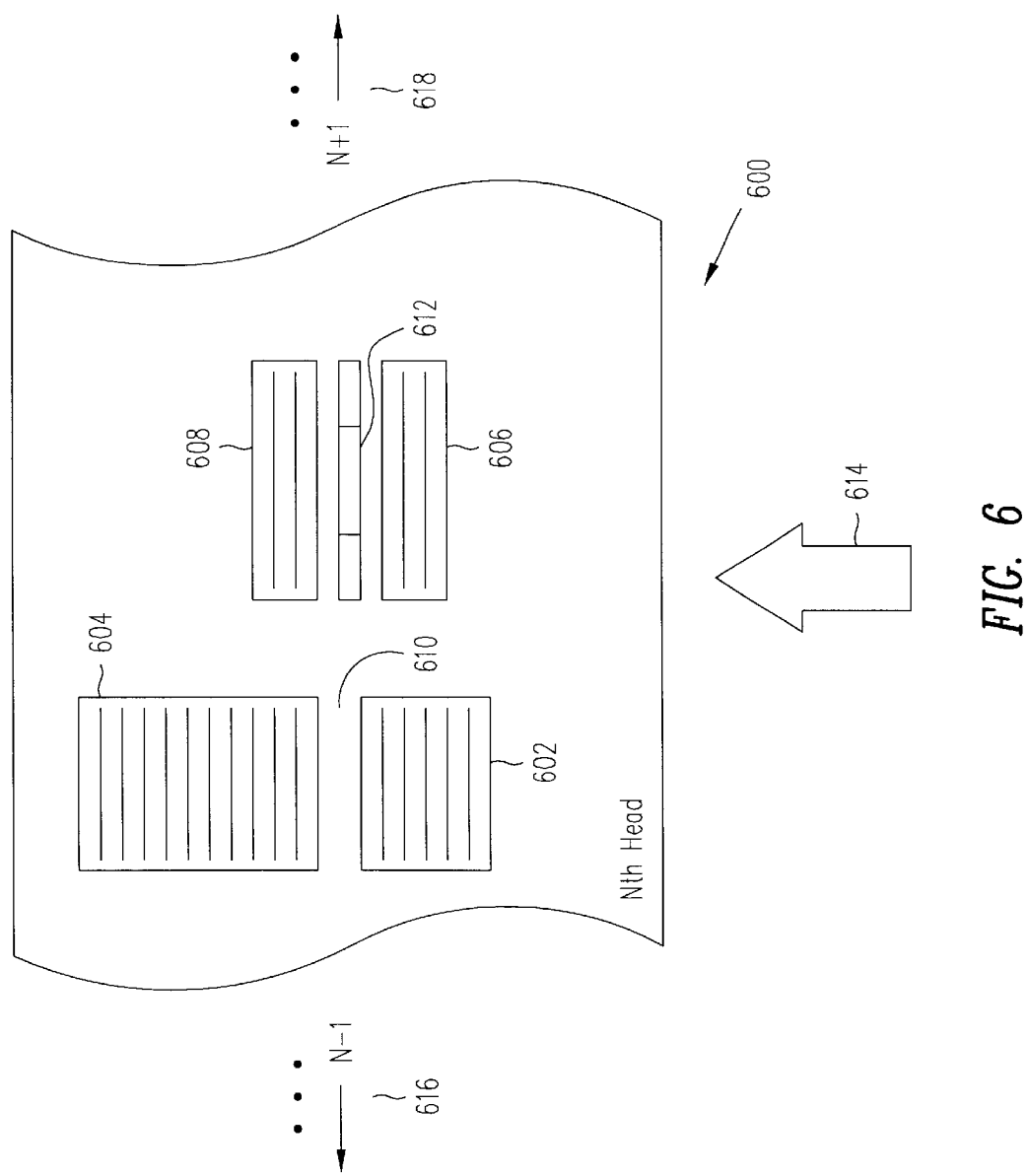
FIG. 6 shows a view of one embodiment of the present invention in a recording head used in a tape drive.

A tape head which incorporates the present invention is illustrated in FIG. 6. The view in FIG. 6 is the recording head 600 as it is presented to the moving tape. In the usual configuration several tape heads are mounted side by side along a row. The view in FIG. 6 is of a single recording head 600 in the row. Typically there would be a head to the left 616, the n−1 head, and a head to the right 618, the n+1 head. Each recording head comprises a write element and a read element. The write element comprises a lower pole 602 called P1 and an upper pole 604 called P2. The write gap 610 is the space between P1 602 and P2 604. The read element comprises a sensor 612 which is disposed between a lower shield 606 and an upper shield 608. In the present invention either P1 602 or P2 604 or both P1 and P2 of the write element is formed from laminated material comprising NiFe/Ta/FeX(N). Also either the lower shield 606 or the upper shield 608 or both the lower and the upper shield can be formed from laminated material comprising NiFe/Ta/FeX (N). The direction of the tape movement across the recording head is shown 614.

Figure 7:
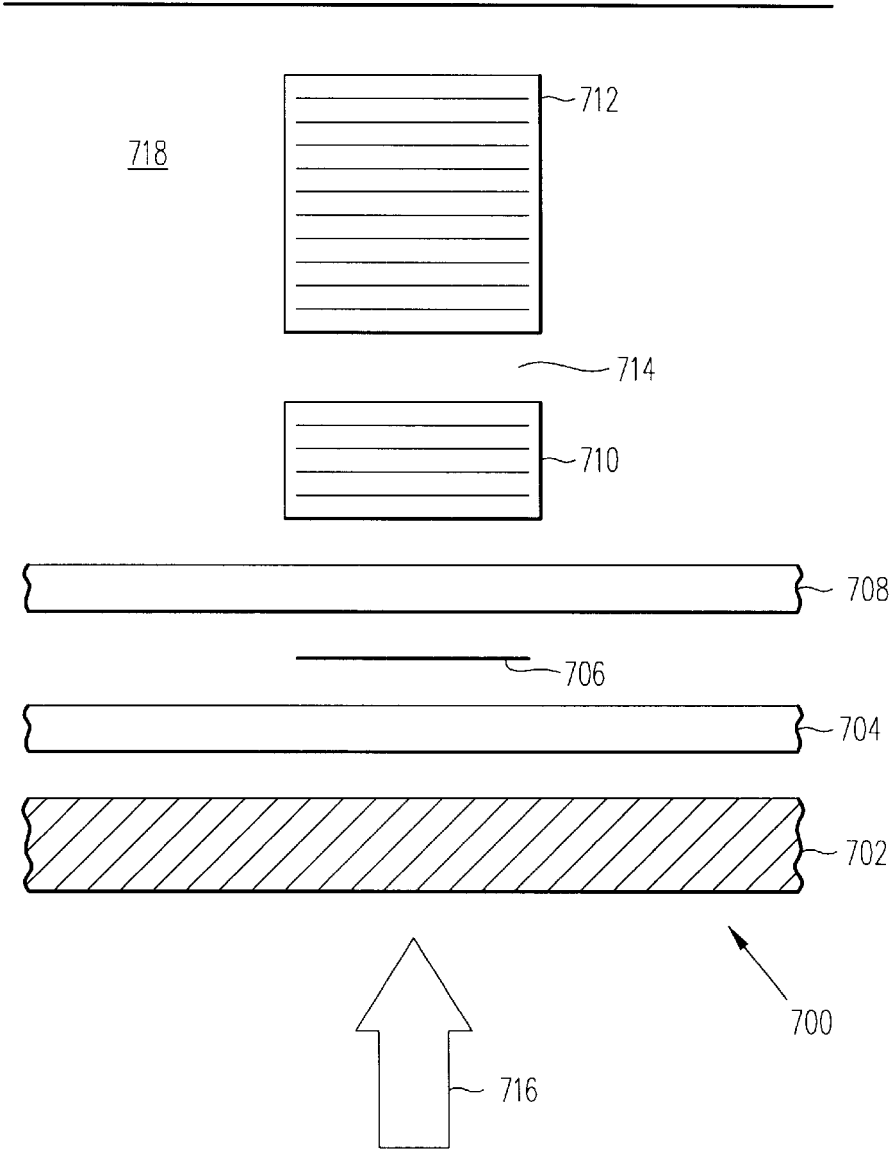
FIG. 7 shows a view of one embodiment of the present invention in a recording head used in a disk drive.

FIG. 7 illustrates a head 700 according to an embodiment of the invention for use in a disk drive 100 (FIGS. 1a, 1b). The recording head is constructed on a substrate 702 usually formed from a rigid ceramic material. The read element comprises a sensor 706 which is disposed between a lower shield 704 and an upper shield 708. The write element is comprised of a lower pole 710 called P1 and an upper pole 712 called P2. The write gap 714 is the space between P1 710 and P2 712. The constituents of the write head and read head are usually embedded in a matrix of insulating material 718 such as alumina. In the present invention either P1 710 or P2 712 or both P1 and P2 of the write element is formed from laminated material comprising NiFe/Ta/FeX(N). The direction of the disk movement relative to the recording head is shown 716.

Figure 8:
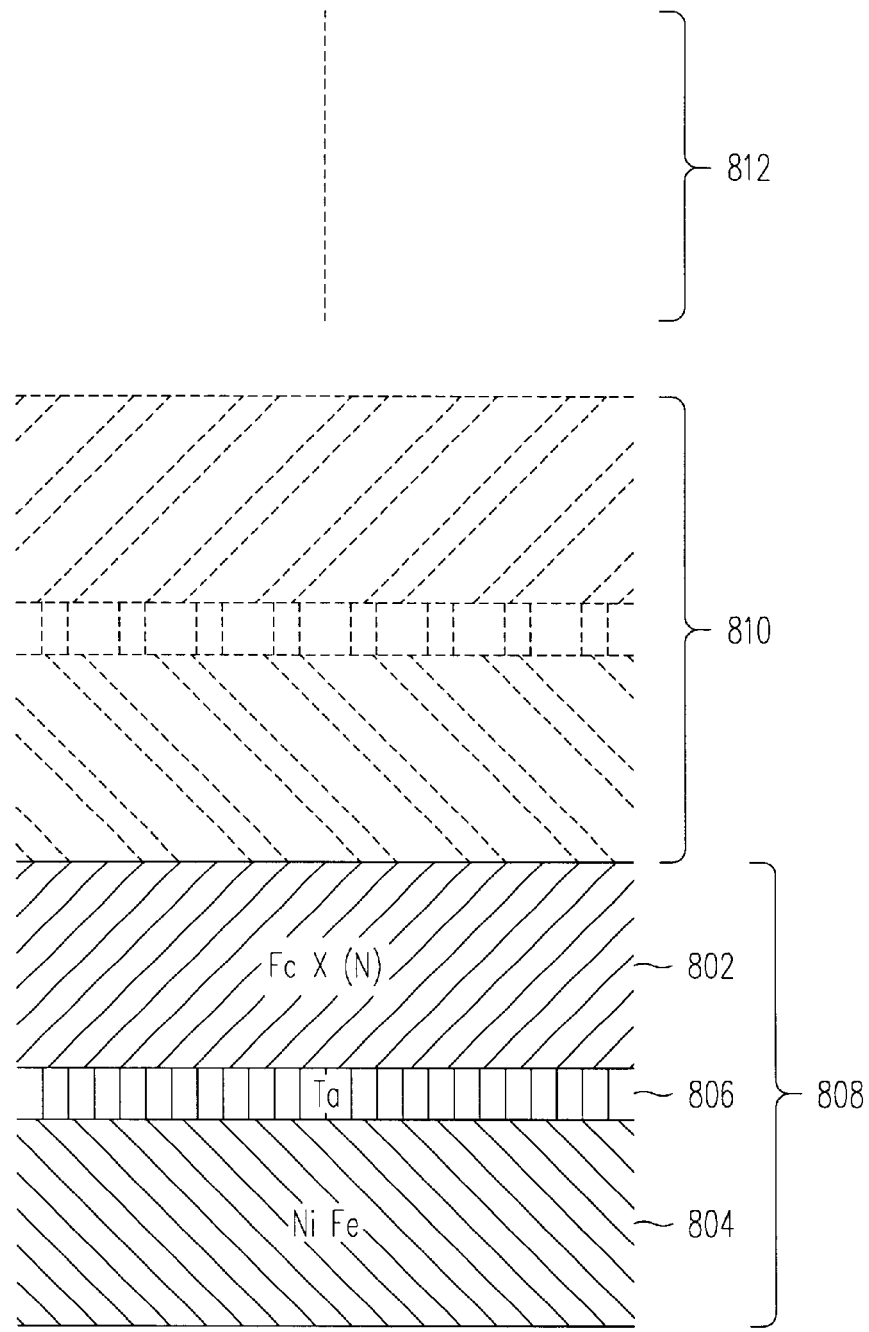
FIG. 8 shows the basic sequence of laminated layers of the present invention.

Disclosed here and shown in FIG. 8 is a high moment iron rich layer 802 laminated with a NiFe alloy 804 where every other interface between the aforementioned layers has an intervening thin Ta layer 806. Due to the low thickness, the presence of the intervening Ta layer 806 does not result in a significant reduction of magnetic moment. In addition, the iron rich layer 802 is alloyed with a another element or combination of elements up to 10% by weight to improve the corrosion resistance of iron. The iron is also nitrogenated to improve wear resistance. The result is a laminated structure which has higher moment than Ni(80%)Fe(20%), good magnetostriction, and good corrosion resistance. Functionally, it is not important if the basic sequence is NiFe/Ta/FeX(N) or FeX(N)/Ta/NiFe.

The preferred embodiment for a laminated material which has excellent magnetostriction and has good magnetic properties is a repeating sequence of NiFe/Ta/FeX(N). The first sequence is labeled as 808 in FIG. 8. The second sequence is also shown 810. The sequences are repeated 812 until a final desired thickness is obtained.

The element X alloyed with iron in the FeX(N) layer is Ta in the preferred embodiment. However other elements or combination of elements will also be suitable. A non-exhaustive list of other suitable elements includes Ru, Al, Cr, Nb, Ti, Zr, Mo, V, W, Hf, Ga, Ge, Si, B, Mg, Ca, Sr, Ba, Mn, and Zn. These elements generally improve the soft magnetic properties of pure iron and also generally improve corrosion resistance of iron. Substantially pure iron can also be used but is more susceptible to corrosion. The amount of X in the FeX(N) can range up to about 10% by weight. Nitrogenation is indicated by the N in parentheses. This means the films are intended to have nitrogen incorporated in the structure, but not to have any specific nitride phases present. The presence of nitride phases usually results in a decrease in the magnetization and the loss of soft magnetic properties, e.g. an undesireable increase in Hc and anisotropy field (Hk). Using the sputtering conditions listed below, the amount of nitrogen in the FeX(N) is typically between 5 to 7 atomic %.

Figure 9A:
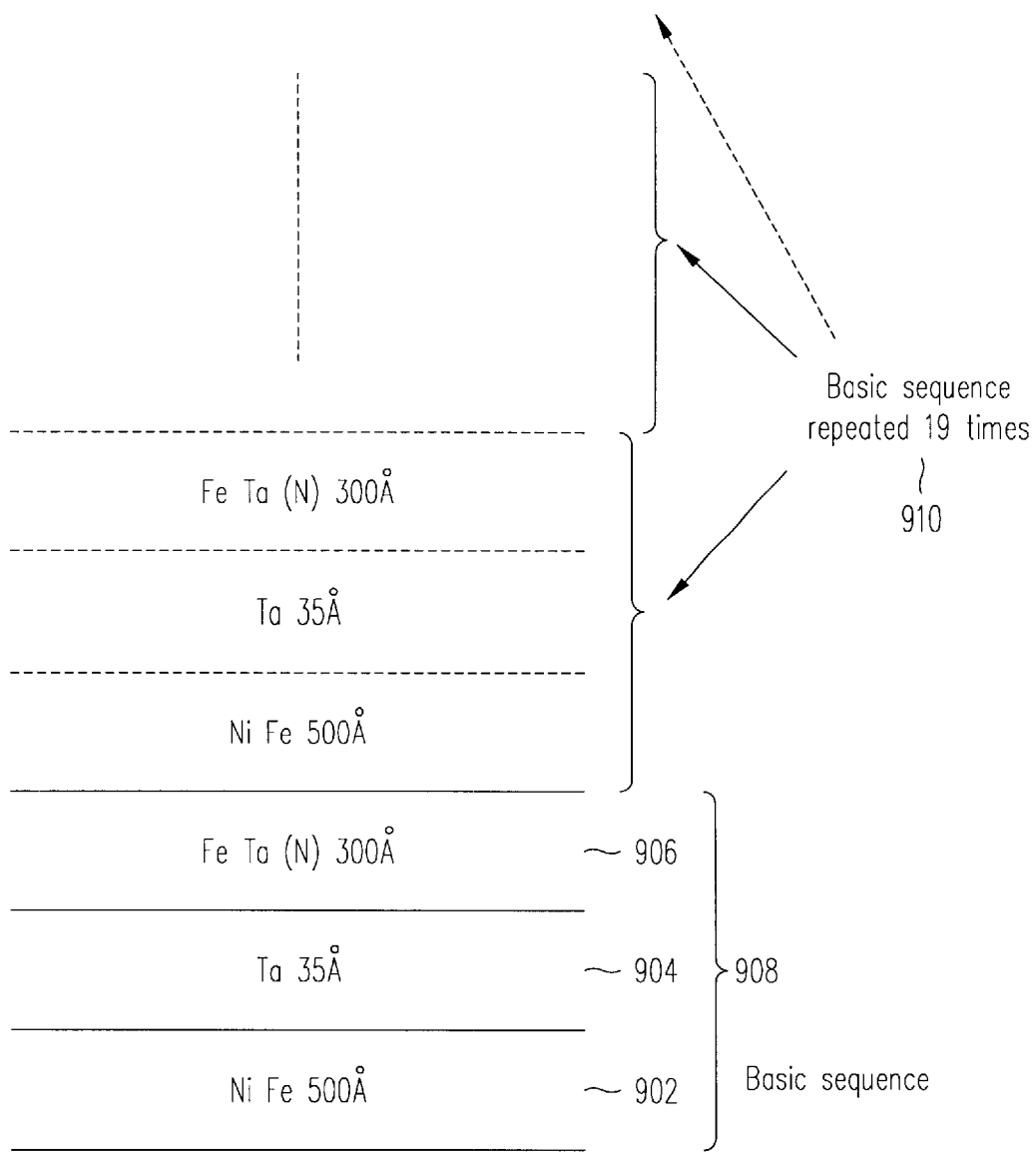
FIG. 9a shows a repeating sequence of layers with Ni(86%)Fe(14%) (500A)/Ta(35A)/FeTa(N) (300A) as the basic sequence.
Figure 9B:
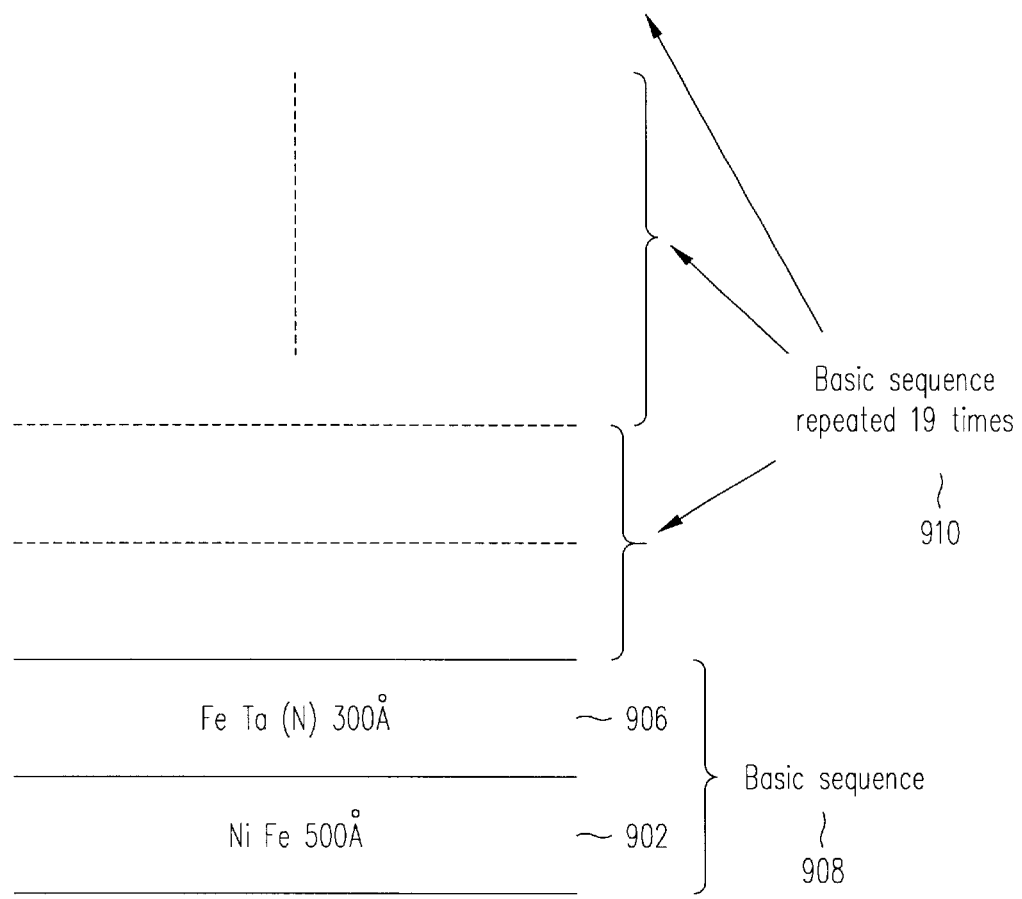
FIG. 9b shows a repeating sequence of layers with Ni(86%)Fe(14%)(500A)/FeTa(N)(300A) as the basic sequence.
Figure 9C:
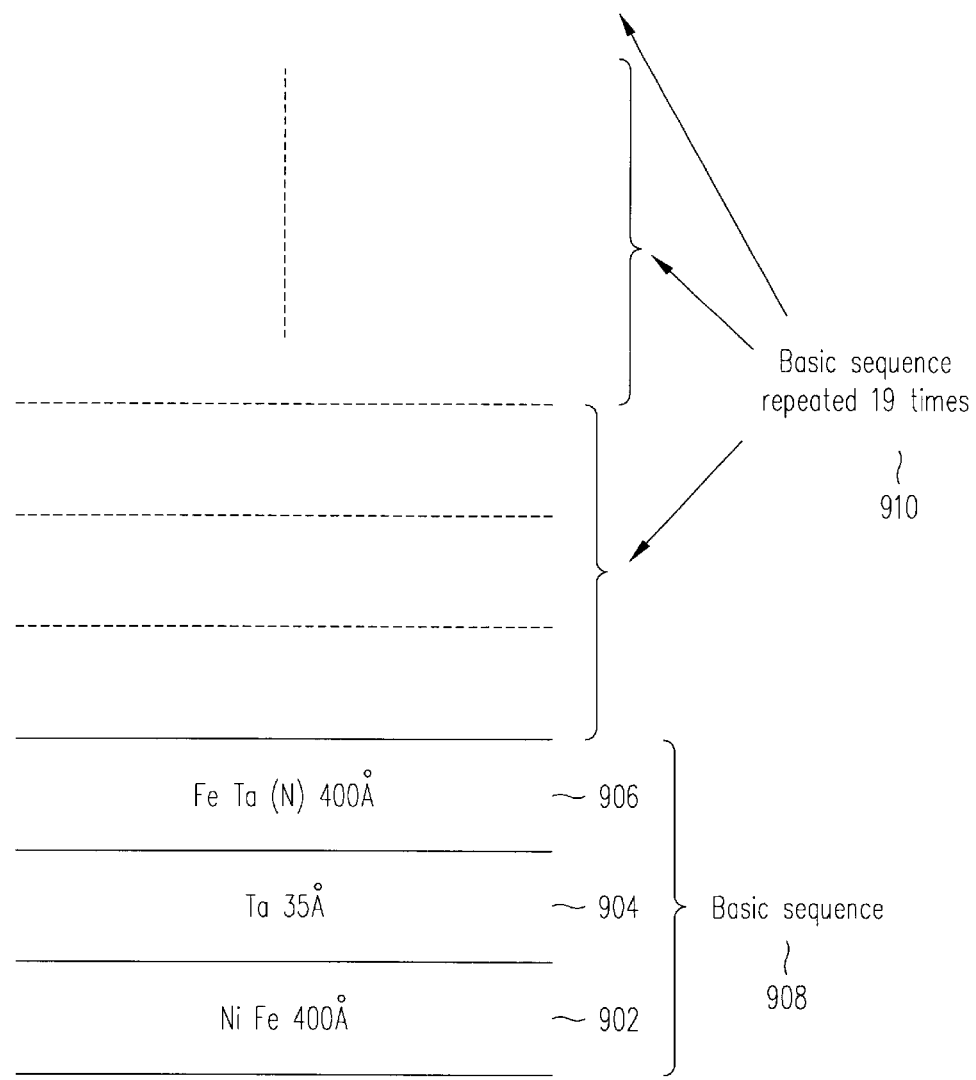
FIG. 9c shows a repeating sequence of layers with Ni(86%)Fe(14%) (400A)/Ta(35A)/FeTa(N)(400A) as the basic sequence.
Figure 9D:
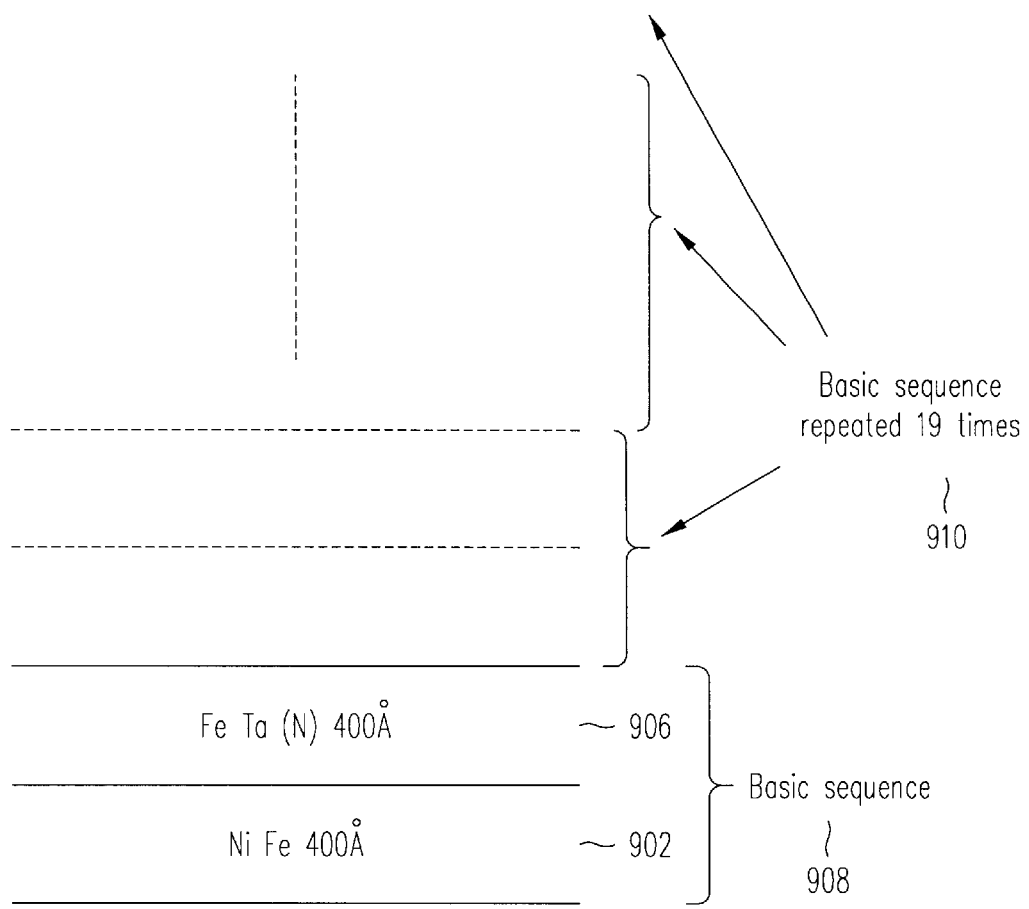
FIG. 9d shows a repeating sequence of layers with Ni(86%)Fe(14%)(500A)/FeTa(N)(300A) as the basic sequence.

This invention was reduced to practice by depositing experimental films using radio frequency diode sputtering. The constructed films are shown in FIGS. 9a, b, c, and d. Other techniques are suitable including radio frequency magnetron sputtering, direct current diode and magnetron sputtering, or any combination of RF and DC sputtering, or ion beam deposition. A negative voltage bias was applied to the substrates during deposition. A small external magnetic field ($\leq$70 Oe) was applied in the plane of the substrate during the deposition of the films of the present invention to provide uniaxial magnetic anisotropy. The field was supplied by the use of bar magnets embedded in the substrate holder or pallet and positioned close to the substrates. The field may be applied by other means such as a series of parallel wires behind the substrate.

In general the thickness of the Ta layer can range from very thin to about 100 A. The thickness of the Ta layer 904 in the experimental films was 35 Angstroms (A). The thickness of the FeX(N) layer 906 and NiFe layer 902 can range from about 100 to 1000 A.

All the films described in FIGS. 9a, b, c, and d are approximately 1.5 microns thick. The targets used were FeTa(2 atomic % Ta), NiFe(Ni86% Fe14% and Ni93% Fe7%), and substantially pure Ta. The composition of the films made from the NiFe targets matched the composition of the targets. However the Ta content in the FeTa films was enriched somewhat compared to the target. The deposition rate for the FeTa(N) and NiFe layers was about 70 A/min and somewhat less for the Ta layer. The process pressure was about $2\times10^{-2}$ mbar. The argon flow was 60 standard cubic centimeters per second (sccm) for all layers. Nitrogen was introduced only during the deposition of the FeTa layer. The temperature of the pallet and wafer surface was between 85 and 90° C. immediately after completion of the film. The annealing was done at 250° C. for 6 hours in an external magnetic field under a rough vacuum. The field matched the orientation of the field used during film deposition. The magnetostriction was measured on silicon strips and the magnetic properties and stress values were measured on silicon wafers. Negative stress is compressive (film wants to expand off the substrate) and positive stress is tensile (film want to pull in on itself and the wafer becomes concave).

FIGS. 9a, b, c, and d show the structures of the constructed laminated films for both the present invention and comparison films. FIG. 9a shows film #1 where the basic sequence of layers is 500A of Ni(86%)Fe(14%) 902, 35 A of Ta 904, and 300 A of FeTa(N) 906. This basic sequence 908 of layers was repeated 19 times to obtain the desired final thickness of about 1.5 microns. FIG. 1b shows the sequence of layers for film #2 which is the same as film #1 except that the Ta layer 904 is missing. Film #2 was constructed to compare with film #1 and show the benefit of the Ta layer 904. The nitrogen flow during the FeTa layer 904 deposition was 3.0 sccm for films #1 and #2. Films #3 and #4, shown in FIGS. 1c and d, are similar to films #1 and #2 except that the thickness of the FeTa layer 906 and NiFe layer 902 were 400 A each. And the nitrogen flow during the FeTa layer deposition was 4.0 sccm.

The evaluation data for films #1, #2, #3, and #4 (shown in FIGS. 9a, b, c, and d) is tabulated in FIG. 10. The saturated moment, Ms, for the finished films averaged about 13 kG. This is substantially higher than the value of about 10 kG for non-laminated Ni(80%)Fe(20%). Annealing generally decreases the magnetostriction of the as-deposited film for the laminations with interleaved Ta layers. Without the Ta layer 904, the magnetostriction generally increases with annealing. The stress in the final film has the opposite trend. However, stress is sensitive to deposition conditions and may vary somewhat. The low value of magnetostriction in the invented films #1 and #3 ($\leq|2\times10^{-6}|$) significantly reduces the burden of managing the film stress.

Corrosion measurements of single layers of FeTa(N) films and Fe(N) films of similar nitrogen content reveals the FeTa(N) films to have the same or better corrosion resistance as the Fe(N) layers when subjected to a chlorine based corrosive environment.

Figure 11:
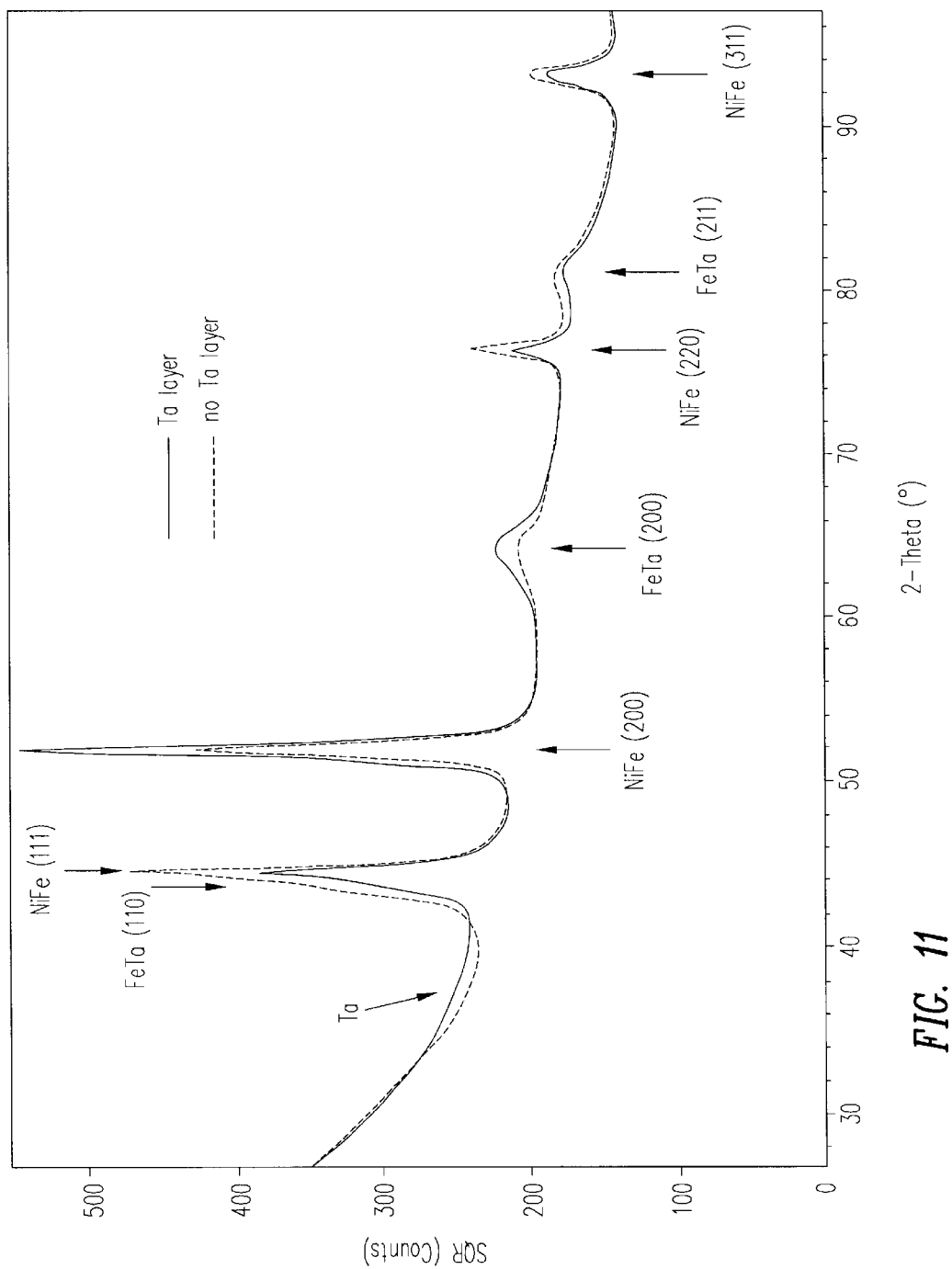
FIG. 11 shows a theta-2theta plot for films with and without the intervening Ta layer.

FIG. 11 shows the theta-2theta x-ray diffraction scan on as-deposited laminate films with and without the 35 A Ta layer 904 under the FeTa(N) layer 906. The specific films are Ni(93%)Fe(7%)(400 A)/Ta(35 A)/FeTa(N)(400 A) (sequence repeated 19 times) and the counterpart film without the 35 A Ta layer. Nitrogen flow during FeTa(N) deposition was 2.0 sccm. The (200) crystal structure is preferred in both the FeTa(N) and NiFe layers in the laminate film with the Ta layers at the expense of the NiFe(111), Fe(110), and NiFe(220) crystal structures. The higher peak intensities for the NiFe peaks over the Fe based peaks reveals a higher defect density or smaller grain size in the FeTa(N) layers. The presence of nitrogen in the interstitial sites in the FeTa film are the source of these crystalline defects and also results in small grains.

The Ta layer influences the crystal structure of both the FeTa(N) and the NiFe layers in the laminate films. The following mechanism may explain this influence. The magnetostriction in a single crystal Ni[100] is more negative than [110] or [111] Ni single crystals. The magnetostriction in a single crystal Fe[100] is more positive than in [110] or [111] Fe single crystals. If the influence on the magnetostiction of the entire laminate film is more predominantly dictated by the NiFe layers rather than the FeTa(N) layers, then the enhancement of the NiFe[200] crystal structure with the presence of the Ta layer would decrease the magnetostriction (increase it in a negative direction). However, usually the magnetostriction in a film comprised of magnetic materials with different magnetic moments would be dominated by the component with the highest magnetic moment. The NiFe layer has a magnetic moment that is lower than FeTa, but with the addition of nitrogen to the FeTa layer the magnetic moment is decreased as the magnetostriction is increased and the soft magnetic properties are enhanced. Also, the tantalum layer itself acts as a getter of nitrogen. Thus the magnetostriction in the laminate films with the tantalum layer would be less positive than in the laminate films with no tantalum layer even when the nitrogen content is similar for both.

While the invention has been shown and described with respect to preferred embodiments thereof, it will be understood by those skilled in the art that changes in form and detail may be made in these embodiments without departing from the scope and teaching of the invention. Accordingly, the multilayered film herein disclosed is to be considered as merely illustrative and the invention is to be limited only as specified in the claims.

I claim:

1. A laminated material for use in a magnetic recording head, comprising:
    a repeating sequence of
    a layer of NiFe;
    a layer of iron alloy; and,
    a layer of substantially pure Ta disposed between said layer of NiFe and said layer of iron alloy;
    said repeating sequence of layers forming at least one of a pole and a shield.

2. A laminated material as in claim 1 wherein said layer of iron alloy is nitrogenated, wherein said sequence is repeated at least four times.

3. A laminated material as in claim 1 wherein said layer of iron alloy comprises at least 90% iron and the remainder comprises essentially tantalum.

4. A laminated material as in claim 1 wherein said layer of iron alloy comprises at least 90% iron and the substantial remainder is chosen from Ru, Al, Cr, Nb, Ti, Zr, Mo, V, W, Hf, Ga, Ge, Si, B, Mg, Ca, Sr, Ba, Mn, and Zn.

5. A laminated material for use in a magnetic recording head, comprising:
    a repeating sequence of
    a layer of NiFe wherein Ni is in the range of from about 80% by weight to about 93% by weight;
    a layer of substantially pure Ta disposed on said layer of NiFe; and,
    a layer of FeTa(N) disposed on said layer of Ta;
    said repeating sequence of layers forming at least one of a pole and a shield.

6. A laminated material for use in a magnetic recording head, comprising:
    a repeating sequence of a first layer constructed of NiFe and having a thickness between about 100 A and 1000 A;
    a second layer constructed of substantially pure Ta disposed on said first layer wherein said second layer has a thickness up to about 100 A; and,
    a third layer constructed of FeTa disposed on said second layer wherein said third layer has a thickness from about 100 A to 1000 A.

7. A recording head for use in a tape drive or a disk drive, comprising:
    a write element including a coil and one or more pole elements disposed around the coil, said pole elements including a laminated material, said laminated material including a repeating sequence of
    a layer constructed or NiFe;
    a layer constructed of iron alloy; and,
    a layer constructed of substantially pure Ta disposed between said layer of NiFe and said layer of iron alloy.

8. A recording head as in claim 7 wherein said layer of iron alloy is nitrogenated, wherein the concentration of iron in said iron alloy layer is at least 90%, wherein the remainder of said iron alloy layer comprises tantalum.

9. A recording head as in claim 7 wherein the concentration of iron in said iron alloy layer is at least 90%.

10. A recording head for use in a tape drive or a disk drive, comprising:
    a read element including a read sensor, a lower shield, and an upper shield, said read sensor being sandwiched between said lower and upper shields, said lower and upper shields including a laminated material, said laminated material including a repeating sequence of
    a layer of NiFe;
    a layer of iron alloy; and,
    a layer of substantially pure Ta disposed between said layer of NiFe and said layer of iron alloy.

11. A recording head as in claim 10 wherein said layer of iron alloy is nitrogenated.

12. A recording head as in claim 10 wherein the concentration of iron in said layer of iron alloy is at least 90%.

13. A tape drive, comprising:
    a recording head, said recording head having a write element, said write element including at least one pole element, said pole element including a laminated material, said laminated material including a repeating sequence of
    a layer of NiFe;
    a layer of substantially pure Ta disposed on said layer of NiFe;
    a layer of iron alloy disposed on said layer of Ta; and,
    a tape transport for moving a recording tape across said recording head.

14. A recording head as in claim 13 wherein said layer of iron alloy is nitrogenated.

15. A recording head as in claim 13 wherein the concentration of iron in said layer of iron alloy is at least 90%.

16. A disk drive, comprising:
    at least one disk;
    at least one slider with an attached recording head for recording on said disk, said recording head having a write element including a coil and an upper and lower pole element disposed about said coil, said pole element including a laminated material, said laminated material including a repeating sequence of
    a layer of NiFe;
    a layer of substantially pure Ta disposed on said layer of NiFe; and,
    a layer of iron alloy disposed on said layer of Ta.

17. A recording head as in claim 16 wherein said layer of iron alloy is nitrogenated.

18. A recording head as in claim 16 wherein the concentration of iron in said layer of iron alloy is at least 90%.

* * * * *